United States Patent [19]
Bach et al.

[11] 4,430,063
[45] Feb. 7, 1984

[54] ELECTRICAL MACHINES CONSTRUCTIONAL SET

[75] Inventors: Erik Bach, Billund; Jørgen P. J. Grønbjerg, Vestervig, both of Denmark

[73] Assignee: Interlego A.G., Baar, Switzerland

[21] Appl. No.: 391,518

[22] Filed: Jun. 24, 1982

[30] Foreign Application Priority Data

Jun. 30, 1981 [DK] Denmark ............................ 2896/81

[51] Int. Cl.³ .............................................. G09B 23/18
[52] U.S. Cl. ........................................ 434/380; 310/1; 434/224; 434/301
[58] Field of Search ............... 434/224, 301, 380; 310/1

[56] References Cited

U.S. PATENT DOCUMENTS

| | | | |
|---|---|---|---|
| 1,202,388 | 10/1916 | Hornby | 310/1 |
| 2,344,438 | 3/1944 | Latour | 434/380 |
| 3,678,310 | 7/1972 | Munn et al. | 310/1 X |

FOREIGN PATENT DOCUMENTS

| | | | |
|---|---|---|---|
| 846054 | 5/1939 | France | 434/380 |
| Ad.54119 | 2/1947 | France | 434/380 |
| 181020 | 5/1923 | United Kingdom | 434/380 |
| 411289 | 6/1934 | United Kingdom | 434/380 |

*Primary Examiner*—William H. Grieb
*Attorney, Agent, or Firm*—Kane, Dalsimer, Kane, Sullivan and Kurucz

[57] ABSTRACT

An electrical machines constructional set comprises a base plate for mounting a pair of stator elements and including bearing apertures for a rotor shaft and a plurality of coupling holes for magnets or electro-magnets provided with complementary coupling prongs. A disk-shaped rotor element also has coupling holes, the number and arrangement of the coupling holes in the rotor element being the same as in the stator element so that parts are interchangeable to construct an electrical motor. A pair of circular disk elements made of soft iron having holes complementary to those of the stator and rotor elements are mounted on each end of the shaft to concentrate the magnetic flux provided by the magnetic elements.

4 Claims, 7 Drawing Figures

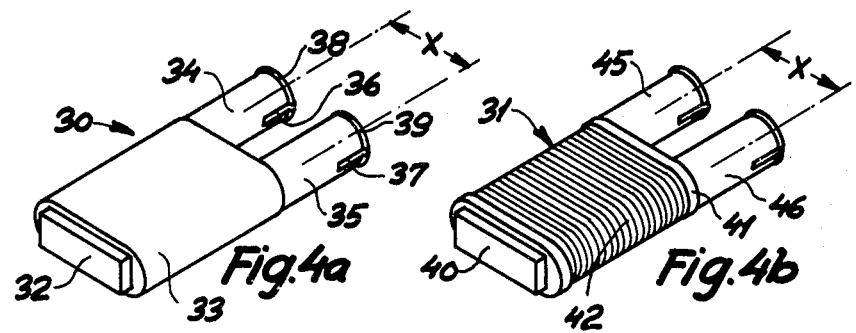
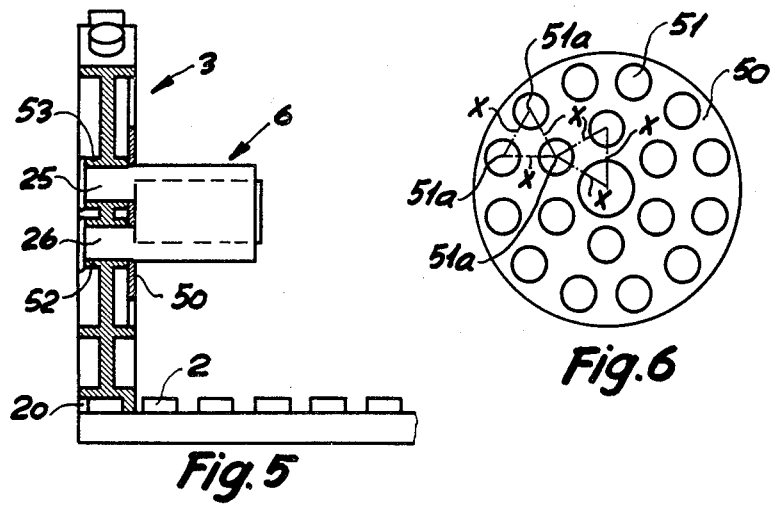

ELECTRICAL MACHINES CONSTRUCTIONAL SET

This invention relates to a building set for building models of electrical machines and, more particularly, to building sets for educational purposes adapted to build and demonstrate the functional principles of models of different types of such machines.

Prior art in this field comprises building sets including components for building models comprising a rotor and a stator and having a plurality of electro-magnetic elements mounted on the stator. Depending on the particular type of machine model which shall be built and demonstrated, the electro-magnetic components on the stator must be arranged in a particular manner, and the stator components and electro-magnetic elements in the previously known building sets may be adapted to satisfy this requirement.

On the other hand, the building sets of prior art have not included means for mounting magnetic or electromagnetic elements on the rotor in a pattern which corresponds accurately to the arrangement of the equivalent magnetic elements on the stator.

It is, therefore, the object of this invention to provide a building set for building models of various types of electrical machines, wherein detachable magnetic elements may readily be mounted on the stator and also on the rotor in relative positions as required in each individual type of machine, such as synchronous motors, alternators, rotary converters, direct current motors etc.

According to the invention, the building set comprises a substantially disc-shaped rotor element which is provided with coupling means for detachably mounting a plurality of magnetic elements having complementary coupling means in selected positions depending on the arrangement of the magnetic elements mounted on the stator elements as determined by the type of machine to be built by the components of the building set.

In a preferred embodiment of the invention, the coupling means of the rotor element is a plurality of coupling holes, and the coupling means of the magnetic elements is a pair of complementary coupling prongs.

According to the invention, the arrangement of the coupling means on the stator elements is preferably identical with the arrangement of the coupling means of the rotor element.

Moreover, in the preferred embodiment of the invention, the coupling means of the stator and rotor elements are a plurality of circular coupling holes disposed symmetrically with respect to the axis of the shaft bearing apertures of said elements, said coupling holes being arranged in a pattern, wherein the distance between the axes of any pair of adjacent coupling holes is equal to the distance between the axes of a pair of coupling prongs of a magnetic element adapted to be detachably mounted in said coupling holes.

With this arrangement of the coupling holes in the rotor element and preferably also in the stator elements, each of the coupling holes will be located in one vertex of an equilateral triangle, wherein each of the two other verteces coincides with the axis of an adjacent coupling hole, the side of said triangle being equal to the distance between the axes of the coupling prongs of the magnetic elements.

The components of the building set and their combination to form a model of an electrical machine are shown by way of example in the drawings, wherein FIG. 1 is a perspective view showing a model of a d.c. (direct current) electromotor;

FIG. 4a is a perspective view of a magnetic component comprising a permanent magnet provided with a pair of coupling prongs;

FIG. 4b is a similar view showing a component in the form of an electromagnet having a pair of coupling prongs including electrical contact means;

FIG. 5 is a sectional view taken on the line V—V of FIG. 2; and

FIG. 6 is a plan view showing a disc-shaped soft iron plate element adapted to be inserted in a magnetic flux circuit.

Figure 1:
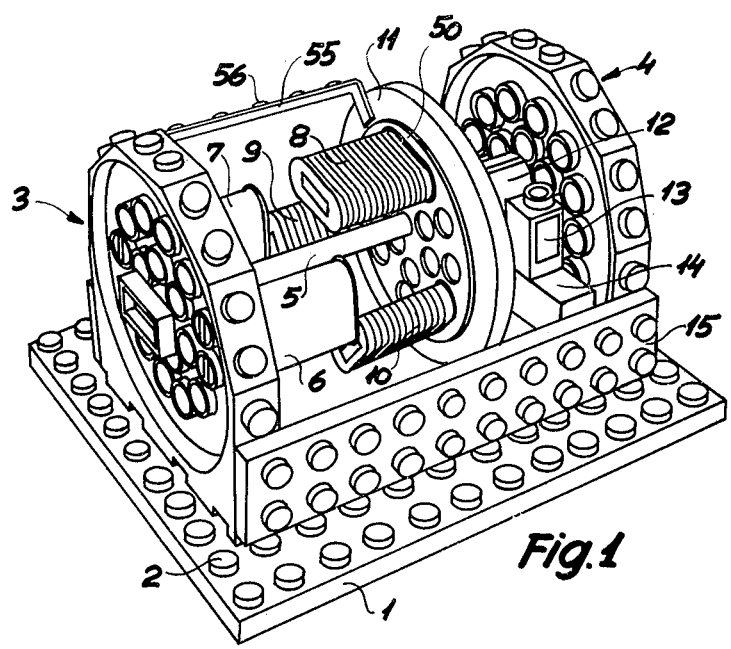

Referring to the drawings, the model of the d.c. motor shown in FIG. 1 is mounted on a base plate 1 provided with a plurality of coupling studs 2 for engagement with complementary coupling means in the other components of the building set.

Figure 3:
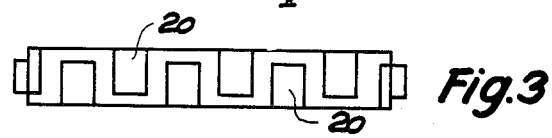
FIG. 3 is a bottom view of the stator element shown in FIG. 2.

The stator elements of the model are a pair of supporting standards 3 and 4 mounted in an upright position on the base plate by means of coupling recesses 20, as shown in FIG. 3, engaging the studs 2 of the base plate 1.

Detachably mounted on the stator element 3 is a pair of permanent magnets 6 and 7, the details of which are shown in FIG. 4a. The two stator elements 3 and 4 are identical and are provided with a central bearing aperture 23 for mounting a rotor shaft 5. Mounted on this shaft is a rotor element 11 provided with a plurality of coupling holes 24, 25, 26, 27 and 29 for detachably mounting electro-magnetic elements 8, 9 and 10, the details of which are shown in FIG. 4b. Adjacent one end of the shaft 5 there is mounted a commutator 12 of conventional construction adapted to co-operate with a fixed contact member 13 mounted on a support 14.

The two stator elements 3 and 4 are mechanically interconnected by elongated components 15 having coupling means adapted to engage complementary coupling studs 22 on the sides of the stator elements 3 and 4.

Referring now to the magnetic elements, the details of which are shown in FIGS. 4a and 4b, the permanent magnetic element shown in FIG. 4a is generally designated as 30. It comprises a flat elongated permanent magnet enclosed in a casing 33, preferably made of an insulating, non-magnetic material, and having a pole face 32 at one end thereof. The opposite pole face is provided with a pair of coupling prongs 34 and 35 having slits 37 and 38 adjacent their ends to provide for elastic compressibility when inserted in the coupling holes of a rotor or stator elements. To increase the coupling effect, the ends of the prongs 34 and 35 are provided with annular beads 38 and 39, respectively.

The magnetic element shown in FIG. 4b is an electromagnet generally designated as 31. It comprises a soft iron core 40, a coil supporting member 41 and a coil 42 thereon. One end of the electro-magnet is provided with coupling priongs 45 and 46 of the same kind as the prongs 34 and 35 of the permanent magnet of FIG. 4a. The distance between the axes of the prongs in both magnetic elements is designated as x. The prongs 45 and 46 include electrical conductors (not shown) connected to the ends of the coil 42 for connecting the coil to a source of energy.

Referring next to the sectional view of FIG. 5, this Figure shows the mounting of the permament, magnetic element, designated as 6 in FIG. 1, in a pair of coupling holes 25 and 26 of the stator element 3. These holes are surrounded by small tubular elements 52 and 53 adapted to receive the ends of the coupling prongs, and the ends of these tubular elements are adapted to co-operate with the beads 38 and 39 of the prongs (FIG. 4a) to detachably interlock the prongs with the stator element. In FIG. 5 there is also shown a disc-shaped element 50, the details of which will be described with reference to FIG. 6. As shown in FIG. 1, this element 50 is interposed between the electro-magnets 8,9,10 and the surface of the rotor element 11.

Referring to FIG. 6, the disc-shaped element 50 is a circular plate element made of a magnetizable material, such as soft iron, and is intended to concentrate the magnetic flux provided by the magnetic elements mounted on the stator and rotor elements. For this purpose, one disc 50 is mounted, as shown in FIG. 5, on one side of the stator element 3 concentrically with the axis of the shaft 5 (not shown in FIG. 5) and adjacent one pole face of the elements 6 and 7, and another disc 50 is mounted on the rotor element 11 adjacent one pole face of the electro-magnets 8,9,10 mounted thereon, as shown in FIG. 1. Yoke elements 55 adapted to close the magnetic flux circuit may be clamped on the connecting members 15 by means of coupling studs 56.

Figure 2:
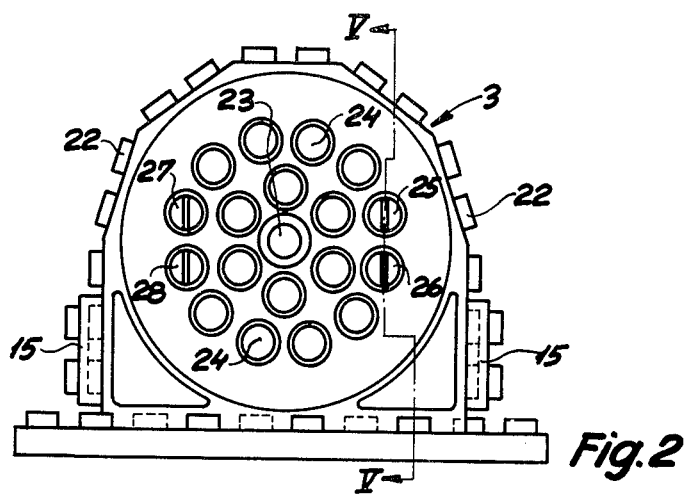
FIG. 2 is an end elevation of the model of FIG. 1 showing one of the stator elements.

In the embodiment shown in the drawings, the arrangement of the coupling holes 24, 25, 26, 27 and 28 around the shaft bearing hole 23, as shown in FIG. 2, is the same in the stator and rotor elements, and since the discs 50 are adapted to be mounted on these elements, they must be provided with corresponding holes 51 and 54 arranged in the same pattern. The following description of this pattern, therefore, also applies to the stator and rotor elements:

As shown in FIGS. 2 and 6, the disposition of the coupling holes is such that the distances between the axes 51a of any pair of adjacent coupling holes is equal to the distance x between the axes of the coupling prongs of the magnetic elements shown in FIGS. 4a and 4b.

Thus, the axis 51a of each coupling hole is located in one vertex of an equilateral triangle, as shown in FIG. 6, and the two other verteces of this triangle coincide with the axes of a pair of adjacent coupling holes, the side of the equilateral triangle being equal to the distance x between the axes of a pair of coupling prongs of the magnetic elements of FIGS. 4a and 4b.

It will be understood that, with this arrangement of the coupling holes, the relative positions of magnetic elements on the rotor and stator elements may readily be rearranged to comply with the requirements of each particular type of machine. Thus, by way of example, the d.c. motor shown in FIG. 1 may be converted into a synchronous a.c. motor by mounting a plurality of electro-magnets, such as 8, 9 and 10, on the stator and a plurality of permanent magnets, such as 6 and 7, on the rotor.

It will also be understood that the use of a disc-shaped rotor element provided with a plurality of coupling holes, as described with reference to the drawings, will enable the magnetic elements to be mounted on both sides of the rotor element, whereby the number and different positions of the magnetic elements will be substantially increased.

What is claimed is:

1. A building set for building a plurality of models of different types of electrical machines each comprising a rotor and a stator and having a plurality of magnetic elements mounted on the stator in a predetermined arrangement depending on the particular type of electrical machine to be constructed by the assembly of the components of the building set, said building set comprising a base plate provided with coupling means for detachably mounting a pair of stator elements thereon, said stator elements having bearing apertures for mounting a rotor shaft therebetween and a plurality of coupling means for detachably mounting a plurality of magnetic elements in a predetermined arrangement on the stator elements, said magnetic elements having complementary coupling means, said building set further comprising a substantially disc-shaped rotor element adapted to be mounted on the rotor shaft intermediate the stator elements and said rotor element comprising a plurality of coupling means for detachably mounting a plurality of magnetic elements having complementary coupling means in selected positions depending on the arrangement of the magnetic elements mounted on the stator elements as determined by the type of machine to be built by the components of the building set wherein the coupling means of the rotor element is a plurality of coupling holes, and the coupling means of the magnetic elements is a pair of complementary coupling prongs.

2. A building set, as claimed in claim 1, in which the arrangement of the coupling means on the stator elements is substantially identical with the arrangement of the coupling means of the rotor element.

3. A building set, as claimed in claim 1, wherein the coupling means of the stator and rotor elements are a plurality of circular coupling holes disposed symmetrically with respect to the axis of the shaft bearing apertures of said elements, said coupling holes being arranged in a pattern, wherein the distance between the axes of any pair of adjacent coupling holes is equal to the distance between the axes of a pair of coupling prongs of a magnetic element adapted to be detachably mounted in said coupling holes.

4. A building set, as claimed in claim 1, wherein each of the coupling holes in the rotor element is located in one vertex of an equilateral triangle, and wherein each of the two other verteces coincides with the axis of an adjacent coupling hole, the side of said triangle being equal to the distance between the axes of the coupling prongs of the magnetic elements.

* * * * *